United States Patent

Henriksson

[11] Patent Number: 5,812,954
[45] Date of Patent: Sep. 22, 1998

[54] MOBILE TELEPHONE POWER KEY LOCK FUNCTION

[75] Inventor: Hannu Henriksson, Oulunsalo, Finland

[73] Assignee: Nokia Mobile Phones Ltd., Salo, Finland

[21] Appl. No.: 562,762

[22] Filed: Nov. 27, 1995

[51] Int. Cl.[6] .................................................. H04Q 7/32
[52] U.S. Cl. ........................................ 455/550; 455/567
[58] Field of Search .............................. 455/38.2, 38.3, 455/574, 565, 550, 343, 103; 379/200

[56] References Cited

U.S. PATENT DOCUMENTS

| | | | |
|---|---|---|---|
| 3,831,081 | 8/1974 | Weiss | 323/349 |
| 4,845,772 | 7/1989 | Metroka | 455/574 |
| 4,924,499 | 5/1990 | Serby | 379/200 |
| 4,933,963 | 6/1990 | Sato | 455/574 |
| 5,241,583 | 8/1993 | Martensson | 455/565 |
| 5,247,565 | 9/1993 | Joglekar | 455/565 |
| 5,265,271 | 11/1993 | Marko | 455/38.3 |
| 5,479,476 | 12/1995 | Finke-Anlauff | 379/58 |
| 5,519,762 | 5/1996 | Bartlett | 455/574 |

FOREIGN PATENT DOCUMENTS 2243117 10/1991 United Kingdom .

Primary Examiner—Dwayne D. Bost
Assistant Examiner—Myron K. Wyche
Attorney, Agent, or Firm—Perman & Green, LLP

[57] ABSTRACT

A method of this invention is disclosed for operating a mobile phone (10) of a type having a power-on key and a plurality of other keys. The method includes the steps of: (a) defining at least one key to represent a secondary power-on key; (b) during a time that the mobile telephone is in an off-state, sensing that the power-on key has been activated; and (c) placing the mobile phone in a partially on-state. The method further includes the steps of: (d) determining, within a predetermined period of time, if the at least one secondary power-on key has been activated; and (e) if it is determined that the at least one secondary power-on key has not been activated within the predetermined period of time, the method restores the mobile phone to the off-state. In one embodiment of this invention the step of defining includes the sub-steps of: presenting a message to a user for prompting the user to depress a key; and in response to the user depressing a key, storing an identity of the depressed key as the secondary power-on key.

10 Claims, 3 Drawing Sheets

5,812,954

MOBILE TELEPHONE POWER KEY LOCK FUNCTION

FIELD OF THE INVENTION

This invention relates generally to radiotelephones and, in particular, to handheld mobile telephones such as those capable of operation with a cellular network.

BACKGROUND OF THE INVENTION

Most mobile telephones (also referred to as a radiotelephone, mobile phone, mobile station, mobile terminal, etc.) require that a power key be depressed for a sufficient period, i.e., longer than some debounce delay (e.g., 10 milliseconds), in order to recognize that the power key has been activated. In this case the mobile phone may include a circuit that debounces the power key and, if the power key is depressed for a sufficient period and if the mobile phone's battery voltage is sufficiently high, removes a reset condition from the mobile phone's internal controller or microprocessor, thereby enabling the mobile to go into an operational state.

However, there are certain situations where it is not desirable to power-on a mobile telephone. One such situation is when the user is aboard an aircraft. As such, it is important to ensure that the mobile phone is not inadvertently switched on, such as by having the power key accidentally depressed when the mobile phone is located within the user's pocket, purse, briefcase, or luggage.

To prevent an inadvertent activation of the power key from powering up the mobile phone, the user can remove the phone's battery pack. However, this may be seen as burdensome to the user. Furthermore, if the user neglects to remove the battery then an inadvertent powering-up of the mobile telephone is still possible.

A mechanical keyguard could also be installed to physically prevent the power key from being depressed. However, such a feature adds expense and complexity to the mobile telephone.

OBJECTS OF THE INVENTION

It is a first object of this invention to provide an improved technique for preventing an inadvertent depression of the power key from turning on a mobile telephone.

It is a second object of this invention to provide a mobile phone power key lock function that does not require that the phone's power source be physically disconnected, and that furthermore does not require the addition of any mechanical keyguard feature to the phone.

SUMMARY OF THE INVENTION

The foregoing and other problems are overcome and the objects of the invention are realized by methods and apparatus in accordance with embodiments of this invention. A method of this invention is disclosed for operating a mobile phone of a type having a power-on key and a plurality of other keys. The method includes the steps of: (a) defining at least one of the keys to represent a secondary power-on key; (b) during a time that the mobile telephone is in an off-state, sensing that the power-on key has been activated; and (c) placing the mobile phone in a partially on-state. The method further includes the steps of: (d) determining, within a predetermined period of time, if the at least one secondary power-on key has been activated; and (e) if it is determined that the at least one secondary power-on key has not been activated within the predetermined period of time, the method restores the mobile phone to the off-state.

In one embodiment of this invention the step of defining includes the sub-steps of: prompting the user to depress a key, such as by displaying a message to the user; and in response to the user depressing a key, storing an identity of the depressed key as the secondary power-on key.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
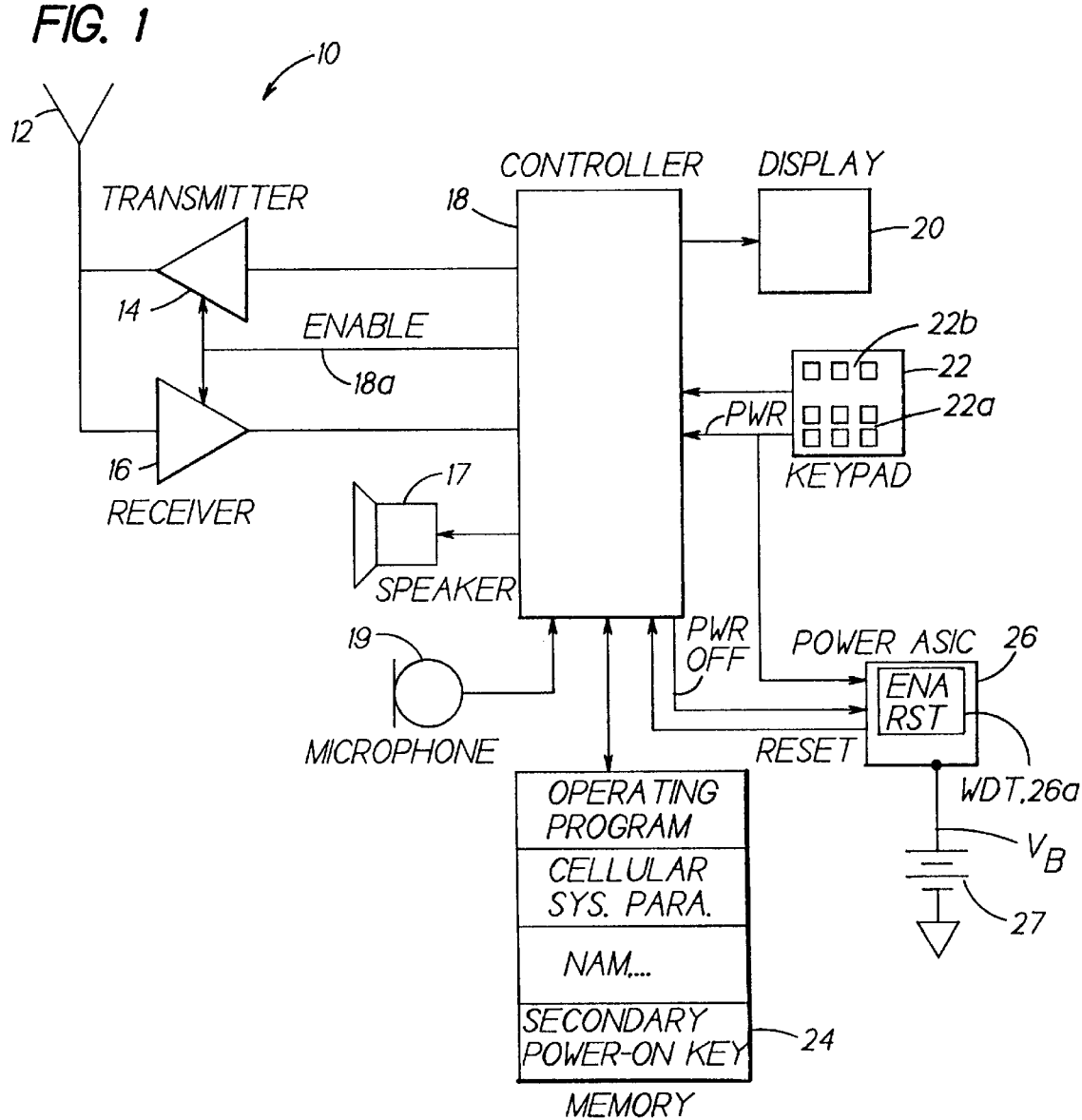
FIG. 1 is a block diagram of a mobile phone that is constructed and operated in accordance with this invention.
Figure 2:
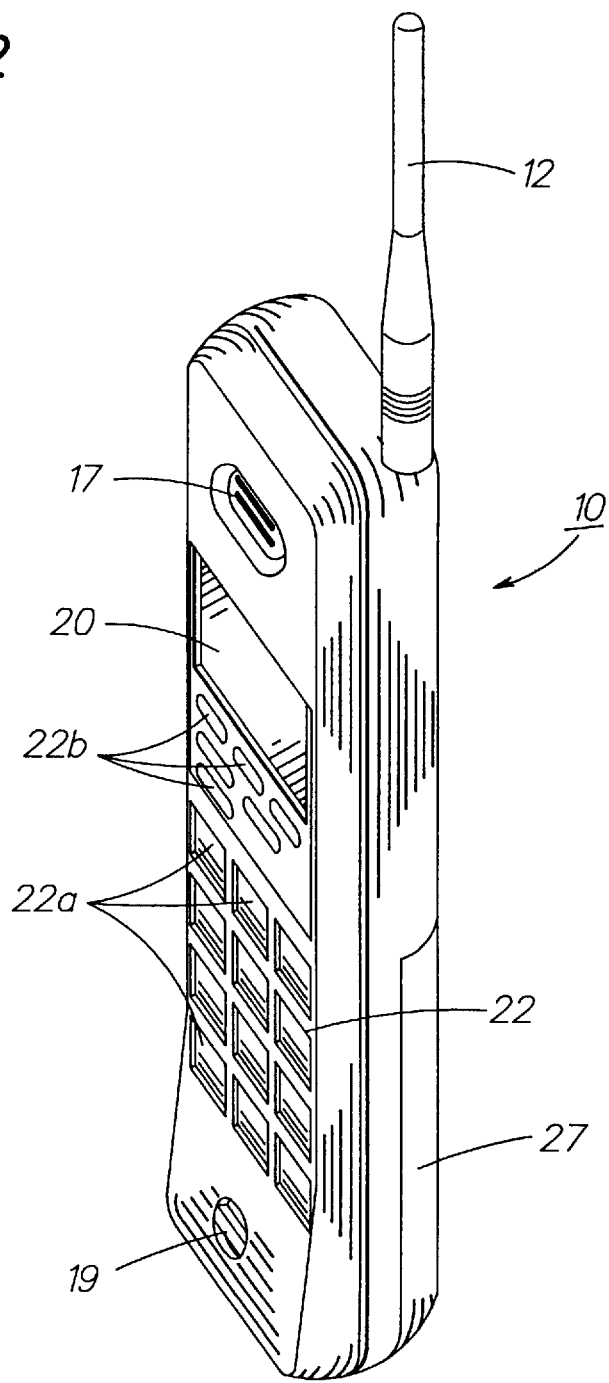
FIG. 2 is an elevational view of the mobile phone shown in FIG. 1.

Reference is made to FIGS. 1 and 2 for illustrating a mobile phone 10 that is suitable for practicing this invention. The mobile phone 10 includes an antenna 12 for transmitting signals to and for receiving signals from a base site or base station (not shown). To this end the mobile phone includes a transmitter 14, a receiver 16, and a controller 18 that provides signals to and receives signals from the transmitter 14 and receiver 16, respectively. These signals include signalling information in accordance with the air interface of the applicable cellular system, and also user speech and/or user generated data.

A user interface includes a conventional speaker 17, a conventional microphone 19, a display 20, and a user input device, typically a keypad 22, all of which are coupled to the controller 18. The keypad 22 includes the conventional number (0–9) and related keys (#,*) 22a, and also other keys 22b used for operating the mobile phone 10. These other keys 22b include, by example, a SEND key, menu scrolling and soft keys, and a PWR key, the activation of which normally turns the mobile phone off and on. The mobile phone 10 also includes various memories, shown collectively as the memory 24, wherein are stored a plurality of constants and variables that are used by the controller 18 during the operation of the mobile phone. For example, the memory 24 stores the values of various cellular system parameters and the number assignment module (NAM). An operating program for controlling the operation of controller 18 is also stored in the memory 24 (typically in a ROM device). The controller 18 outputs a signal (ENABLE) 18a to the transmitter 14 and the receiver 16 that is used for activating these circuits when it is desired to transmit and/or receive information.

The mobile phone 10 also includes a power control device, referred to herein as a power ASIC 26, that includes a watch dog timer (WDT) 26a. The power ASIC 26 is coupled to the phone's battery 27, to the power (PWR) key of the keypad 22, and to the controller 18. During normal operation, a depression of the phone's PWR key signals the power ASIC 26 to lift a reset on the controller 18, so long as the voltage ($V_B$) of the battery 27 exceeds some predetermined minimum threshold. operating power to the phone's circuitry can also be switched through the power ASIC 26.

The power ASIC 26 outputs the reset signal to the controller 18 and asserts and deasserts same to control the reset state of the controller 18. The power ASIC 26 also receives a power off (PWROFF) signal from the controller 18. The PWROFF signal is periodically asserted by the controller 18 during normal operation so as to reset (RST) the WDT 26a. In this regard the WDT 26a may be enabled (ENA) to begin incrementing (or decrementing) when the PWR key is depressed (and debounced). If the WDT 26a reaches some predetermined count without being reset, the power ASIC 26 asserts the reset signal to reset the controller 18, and automatically turns off the mobile phone 10. This condition may indicate that the controller 18 has malfunctioned, and the phone is thus disabled so as to prevent, by example, inadvertent transmissions from occurring. Assuming that the controller 18 is operating normally, the PWROFF signal is periodically asserted by the controller 18, thereby resetting the WDT 26a and preventing the power ASIC 26 from resetting the controller 18 and turning off the mobile phone 10.

It should be understood that the mobile phone 10 can be a vehicle mounted or a handheld device. It should further be appreciated that the mobile phone 10 can be capable of operating with one or more air interface standards, modulation types, and access types. By example, the mobile phone may be capable of operating in accordance with a frequency modulated (FM), frequency division multiple access (FDMA) transmission and reception standard, such as one known as EIA/TIA-553 (AMPS). The phone may also be capable of operating with any of a number of other analog or digital standards, such as GSM, EIA/TIA 627 (DAMPS), IS-136 (DDAMPS), and IS-95 (CDMA). Narrow-band AMPS (NAMPS), NMT, DCS, as well as TACS mobile phones may also benefit from the teaching of this invention. It should thus be clear that the teaching of this invention is not to be construed to be limited to any one particular type of mobile phone or air interface standard.

In accordance with an aspect of this invention the operating program in the memory 24 includes a routine to prompt the user, such as by presenting a message to the user on the display 20. The message can be displayed as a part of a menu function, and prompts the user to identify one of the keys 22a or 22b that is to be used to implement the improved power key lock function of this invention. In response to the message the user depresses a desired key (for example the # key), also referred to herein as a Secondary Power-On Key. The identified key code is then stored in the memory 24 (in a non-volatile memory) in a location associated with the Secondary Power-On Key.

It should be realized that once the Secondary Power-On Key has been defined, another menu function can be employed to activate and de-activate the use of the Secondary Power-On Key. That is, the user may desire to activate the use of the Secondary Power-On Key only on certain occasions, such as when travelling on a plane. When not activated, a depression of the phone's PWR key alone is sufficient to place the phone in an operational status, in a conventional manner.

It should further be realized that the identity of the Secondary Power-On Key can be established when the phone is manufactured or activated, and may not be a user-selectable parameter.

Figure 3:
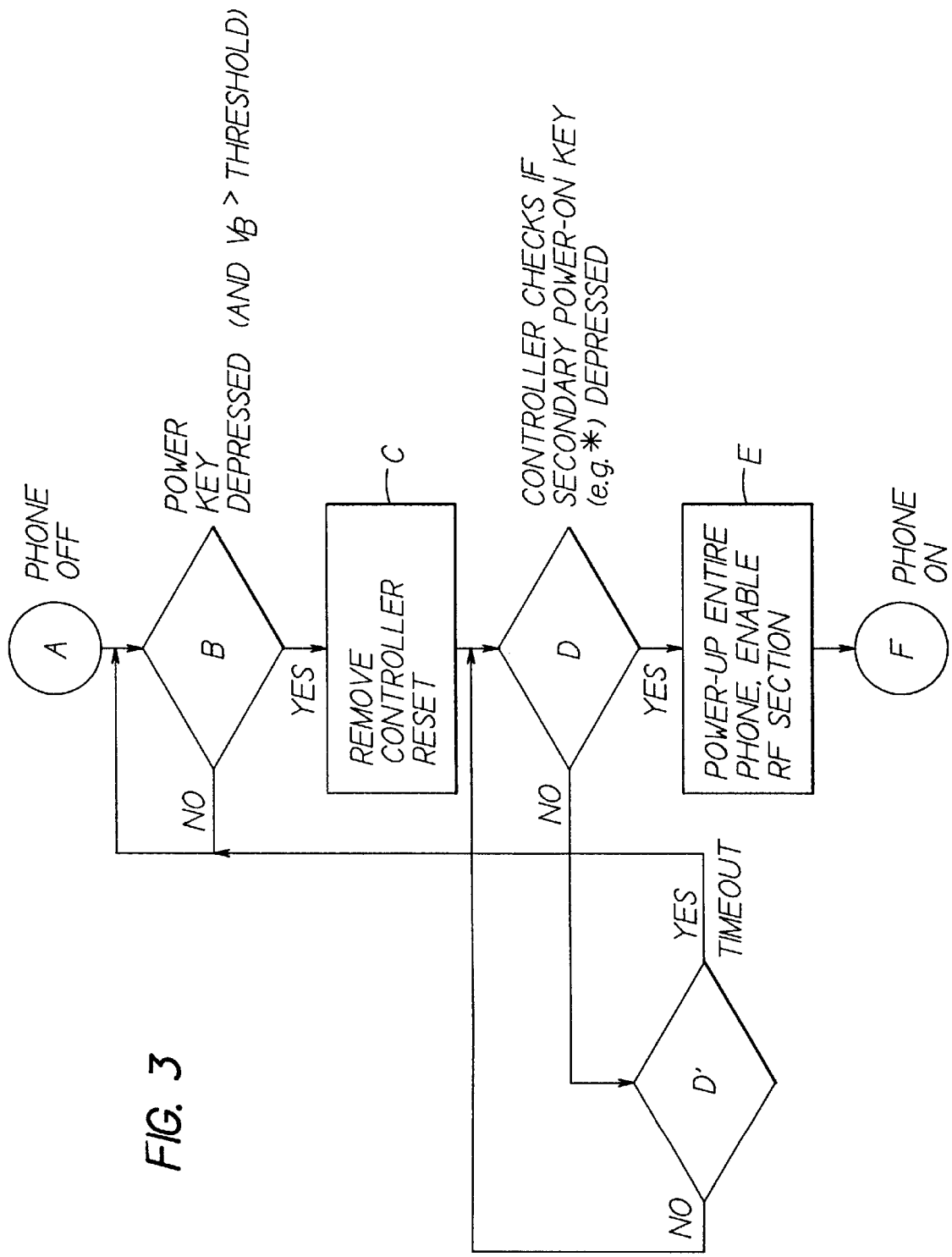
FIG. 3 is a logic flow diagram that illustrates a power key locking method executed by the mobile phone shown in FIGS. 1 and 2.

Reference is now made to FIG. 3 for illustrating a method in accordance with this invention. The method is executed by the power ASIC 26 in cooperation with the controller 18. At Block A the mobile phone 10 is assumed to be in an Off state. At Block B, the user intentionally or inadvertently depresses the PWR key. Assuming that the PWR key is depressed for a period longer than the debounce period, and that $V_B$ is above the predetermined minimum threshold voltage, the WDT 26a is enabled to begin incrementing (or decrementing) and, at block C, the power ASIC 26 removes (deasserts) the reset signal to the controller 18. At this time the mobile phone 10 is considered to be in a "partially-on" state. That is, at least parts of the phone are functional, although the entire phone may not yet be in a fully functional status.

Once the reset signal is deasserted the controller 18 initiates processing and, in accordance with this invention, enters a state (Block D) where the controller 18 checks to see if a keypad 22 key is depressed that is equal to the keycode (e.g., #) stored in the Secondary Power-On Key memory location. The controller 18 may loop between Blocks D and D' to check the input from the keypad 22 and to also execute a time-out routine. One suitable time out value is, by example, two seconds. If the controller 18 determines at Block D that the user has depressed the Secondary Power-On Key, control passes to Block E where the entire phone is powered up and made functional, and where the RF section may be enabled by asserting the Enable signal 18a. The mobile phone 10 is in an On state when control passes to block F. As a part of the On state processing, the controller 18 periodically asserts the PWROFF signal to reset the WDT 26a, thereby preventing the power ASIC 26 from resetting the controller 18.

Returning to block D', if the predetermined time-out period expires without the user depressing the Secondary Power-On Key, the controller 18 does not reset the WDT 26a using the PWROFF signal. As a result, this eventually causes the value of the WDT 26a to equal a predetermined value which in turn causes the power ASIC 26 to reset the controller 18 and restore the mobile phone 10 to the Off state.

By example, the predetermined time-out period (Block D') may be set so as to be longer (e.g., infinity) than the time-out period of the WDT 26a. So long as the controller 18 continues to loop between Blocks D and D', or to reside only in Block D if the time-out routine at Block D' is not used, the WDT 26a continues to increment (or decrement), and thus eventually times-out ensuring that the mobile phone 10 will not enter the On state at Block F. That is, assuming that the user does not depress the Secondary Power-On Key within the time-out period of the WDT 26a, the phone 10 is restored back to the Off state at Block A.

It should be realized that although this invention has been described in the context of a single Secondary Power-On Key, it is within the scope of this invention to provide for the assignment of a plurality of Secondary Power-On Keys. In this case depressing any one of the Secondary Power-On Keys is sufficient to bring the phone to a fully operational status. Alternatively, two or more of the Secondary Power-On Keys must be depressed, in a random order or in a specified order, so as to bring the phone to a fully operational status.

It is also within the scope of this invention to define the PWR key itself to be the Secondary Power-On Key. In this case, at least two successive depressions of the PWR key are required (within the time-out period) in order to place the phone in a fully operational status.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile phone of a type having a key pre-defined as a power-on key and a plurality of other keys, comprising the steps of:

defining at least one of the keys to represent a secondary power-on key;

during a time that the mobile phone is in an off-state, sensing that the power-on key has been activated;

placing the mobile phone in a partially on-state;

determining, within a predetermined period of time, if the at least one secondary power-on key has been activated; and if the step of determining indicates that the at least one secondary power-on key has not been activated within the predetermined period of time, restoring the mobile phone to the off-state.

2. A method as set forth in claim 1, wherein the step of defining includes the step of:

in response to the user depressing a key, storing an identity of the depressed key as the secondary power-on key.

3. A mobile phone of a type having a key pre-defined as a power-on key and a plurality of other keys, said mobile phone comprising:

a memory for storing an identity of at least one key that is specified for functioning as a secondary power-on key; and power control means having inputs coupled to the power-on key, to the plurality of other keys, and to the memory, said power control means comprising, means, responsive to the power-on key being activated during a time that the mobile phone is in an off state, for placing the mobile phone in a partially on-state; and means for determining, within a predetermined period of time when the mobile phone is in the partially on-state, if the at least one secondary power-on key has been activated and, if not, for restoring the mobile phone to the off-state.

4. A mobile phone as set forth in claim 3, and further comprising:

means for presenting a message to a user for prompting the user to depress a key; and in response to the user depressing a key, for storing within said memory an identity of the depressed key as the secondary power-on key.

5. A mobile phone as set forth in claim 3, wherein said mobile phone is further comprised of a battery for providing operating power to said mobile phone, and wherein said means for placing the mobile phone in a partially on-state has an input coupled to said battery for placing the mobile phone in the partially on-state only when a voltage of said battery exceeds a predetermined minimum threshold.

6. A mobile phone as set forth in claim 3, wherein said predetermined period of time is established by timer means reaching a predetermined value.

7. A mobile phone as set forth in claim 6, wherein said determining means is comprised of a programmable control means, wherein said timer means is coupled to said power-on key and is enabled to operate by said power-on key being activated, and wherein said timer means is coupled to said programmable control means for being periodically reset by said programmable control means.

8. A mobile phone as set forth in claim 7, wherein said programmable control means is responsive to said at least one secondary power-on key being activated, when the mobile phone is in the partially on-state, for preventing an output of said timer means from equalling said predetermined value.

9. A mobile phone as set forth in claim 3, wherein said at least one secondary power-on key is selected from a group consisting of said power-on key and said plurality of other keys.

10. A method for operating a mobile phone of a type having a primary power-on key and a plurality of other keys, comprising the steps of:

in response to an input from a user, defining one of the other keys to represent a secondary power-on key;

during a time that the mobile phone is in an off-state, sensing that the primary power-on key has been activated and, in response, placing the mobile phone in a partially on-state only if it is determined that a power supply voltage exceeds a predetermined threshold voltage;

determining, within a predetermined period of time after placing the mobile phone in the partially on-state, if the secondary power-on key is activated; and if the secondary power-on key is not activated within the predetermined period of time, restoring the mobile phone to the off-state;

else, if the secondary power-on key is activated within the predetermined period of time, placing the mobile phone in a fully on-state.

* * * * *